Feb. 7, 1939.　　　　F. MARASSO　　　　2,146,151
LOADING APPARATUS FOR PROOFERS
Filed April 5, 1938　　　　4 Sheets-Sheet 1

Inventor:
Fred Marasso,
by Charles O. Shurvey
his Atty.

Feb. 7, 1939.  F. MARASSO  2,146,151
LOADING APPARATUS FOR PROOFERS
Filed April 5, 1938  4 Sheets-Sheet 3

Inventor:
Fred Marasso,
by Charles O. Shurvey
his Atty.

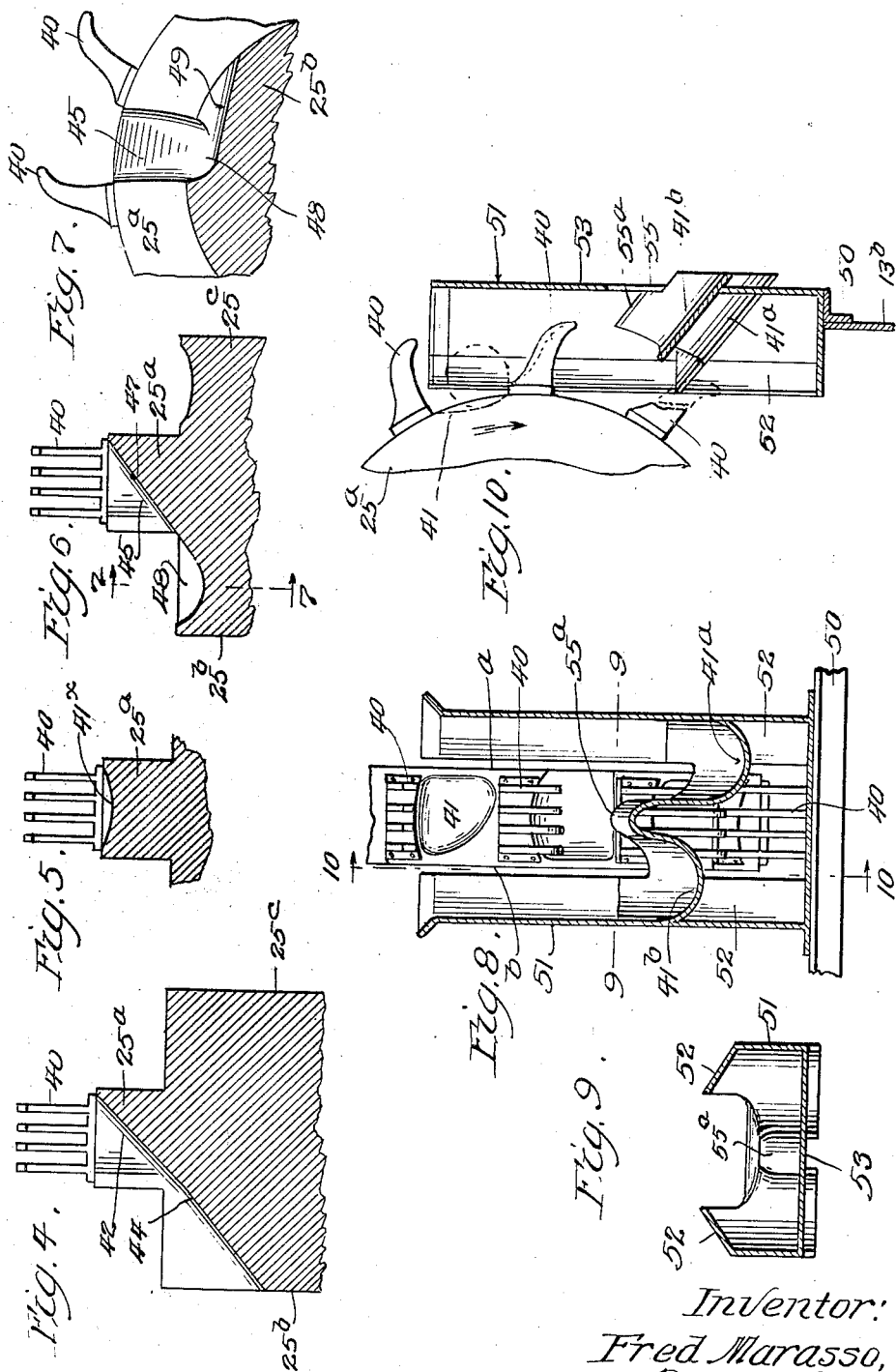

Patented Feb. 7, 1939

2,146,151

UNITED STATES PATENT OFFICE 2,146,151

LOADING APPARATUS FOR PROOFERS

Fred Marasso, Joliet, Ill., assignor to Union Machinery Company, Joliet, Ill., a corporation of Illinois Application April 5, 1938, Serial No. 200,170

15 Claims. (Cl. 198—31)

This invention relates to loading apparatus for proofers, and some of its objects are to increase the capacity of the apparatus, to improve upon its efficiency and to speed up its action so as to enable it to handle dough lumps coming from a high speed rounder.

In the present day bakeries, speed is an important factor and as many as one hundred twenty or more dough lumps are handled per minute and the work of loading them into the trays of the proofer must be carried on at the same rate. As is well known, long or plural pocket trays are commonly used in proofers, each of which accommodates several dough lumps and in the present instance the loader has been devised to load six dough lumps into each tray during a very short interval of time. A loader operating in conjunction with a rounder, delivering one hundred twenty dough lumps per minute, and a proofer equipped with trays accommodating six dough lumps and passing a given point at the loading station at the rate of one tray every three seconds, the loader must pick up six dough lumps, one at a time, distribute them to six spaced places and deliver the six spaced dough lumps into a tray every three seconds. To accomplish this effectively and to prevent the loader from becoming jammed, requiring the stoppage of the entire line, is a problem that has presented many difficulties and one of the objects of this invention is to overcome these difficulties. Another object is the provision of a loading drum capable of loading six or more dough lumps into each of two trays during each complete rotation of the loading drum thereby enabling the drum to rotate at less speed and, therefore, operate with greater efficiency than can be obtained with a high speed drum having the same capacity.

With these and other objects in view, this invention consists of a loader capable of loading six or more dough lumps into each tray during a minimum interval of time. It further consists of a loader having a drum composed of sections with means for transferring certain lumps from one section to the others, from which they are loaded into trays, the main section also serving to deliver one or more dough lumps directly to the same trays and having means whereby other dough lumps are delivered through the other sections to the same trays whereby at least six dough lumps may be picked up, distributed in spaced relation and loaded into a tray during each cycle of operation.

The invention further consists in a loading apparatus having a loading drum capable of loading two trays during one complete rotation of the drum.

The invention further consists of the several novel features of construction, arrangement and combination of parts hereinafter fully set forth and claimed.

One embodiment of the invention is clearly illustrated in the drawings accompanying this specification in which:

Fig. 4 is a detail, fragmental, cross-section through the loading drum taken on the line 4—4 of Fig. 1.

Fig. 5 is a similar view taken on the line 5—5 of Fig. 1.

Fig. 6 is a similar view taken on the line 6—6 of Fig. 1.

Fig. 7 is a detail, fragmental vertical section taken on the line 7—7 of Fig. 6.

Fig. 8 is a vertical cross-section taken on the line 8—8 of Fig. 1.

Fig. 9 is a detail, horizontal section taken on the line 9—9 of Fig. 8.

Fig. 10 is a vertical, longitudinal, fragmental section taken on the line 10—10 of Fig. 8.

Figure 1:
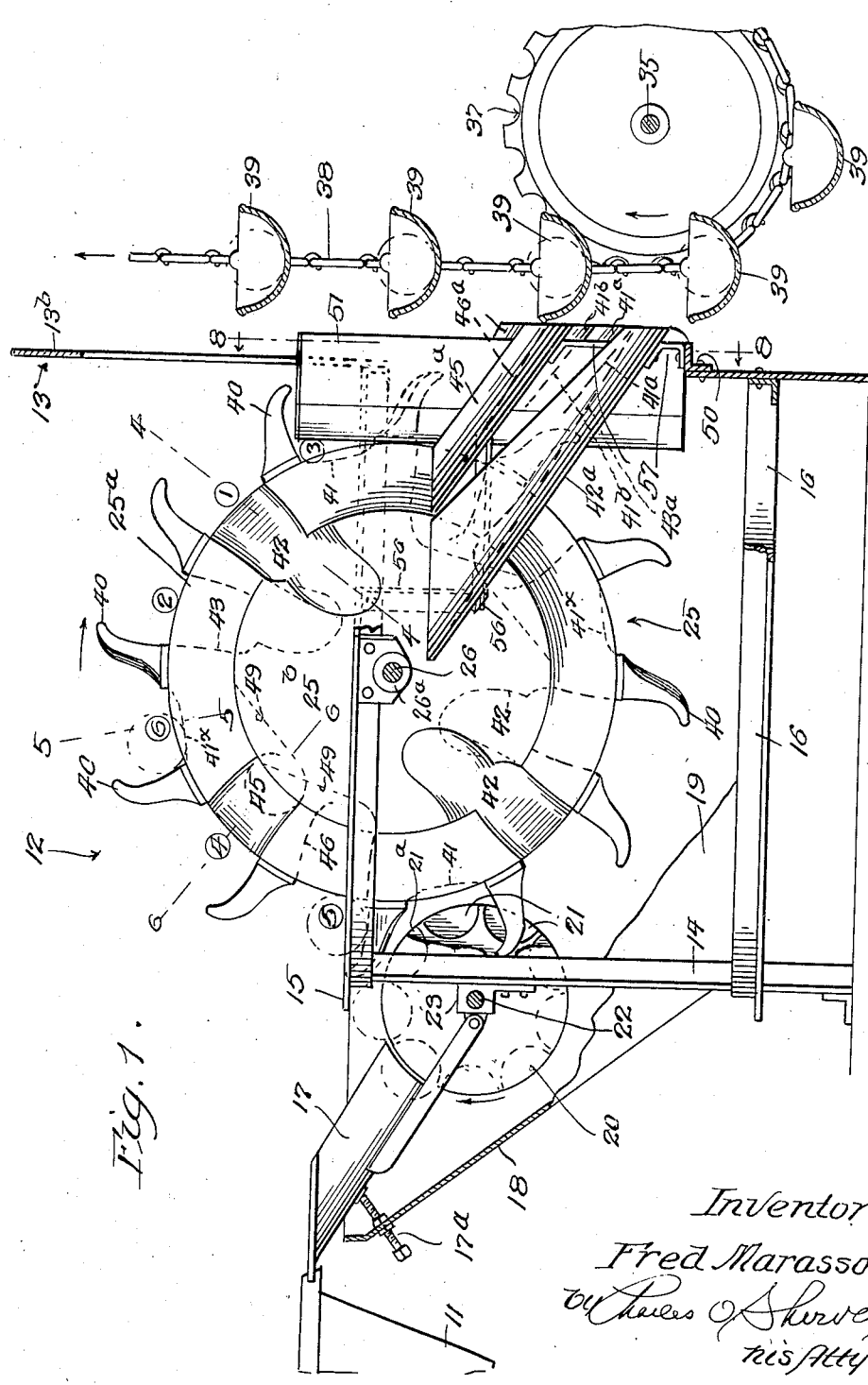
Fig. 1 is a side elevation of a proofing apparatus partly broken out and showing certain parts in vertical section.

This invention is in the nature of an improvement upon prior inventions of mine shown and described in Letters Patent No. 2,064,437 dated December 15, 1936 for improvements in Loading device for proofers, to which reference will be made hereafter.

Referring to said drawings which illustrate a simple embodiment of the invention applied to a loading apparatus for loading trays accommodating six dough lumps, the reference character 11 designates a fragment of a rounder, 12 the loading apparatus forming the subject matter of this specification, and 13 a fragment of the loading end of a proofer of common and well known construction.

The mechanism of the loading apparatus is carried by a frame here shown as comprising uprights 14 to which are connected horizontal frame members 15, 16, which extend to and are connected to the frame work of the proofer.

Hingedly connected to the uprights is an inclined troughlike chute 17, the upper end of which is supported by an adjustment screw 17a mounted in a wall 18 which is secured to the frame and encloses the front end of the apparatus. Other side walls 19 may be provided to enclose the sides thereof. The chute is arranged to receive the dough lumps as they are discharged from the rounder and to deliver them to transfer mechanism which conveys them one at a time to the loading drum.

The transfer mechanism here shown comprises a rotating lump spacing drum 20 which may be constructed substantially similar to the spacing drum illustrated in the above mentioned Patent No. 2,064,437, and like the drum shown in said patent, may be composed of several spaced discs, the intermediate ones of which have peripheral notches therein to provide pockets 21 which receive the dough lumps from the chute and deliver them in spaced relation to the loading drum. The spacing drum is mounted on a shaft 22 journaled in brackets 23 mounted on the uprights 14, and is driven from a driving element of the proofer so as to rotate in timed relation to the loading drum and proofer trays as will be hereinafter set forth.

The loading drum 25 is mounted on a shaft 26 journaled in bearing brackets 26ª carried by the frame members 15 and is driven from the proofer by suitable gearing. The gearing between the spacing drum, loading drum and proofer may comprise sprocket wheels 27, 28, respectively mounted on the shafts 22, 26, and a sprocket chain 29 trained around said sprocket wheels; sprocket wheels 30, 31 respectively mounted on the shaft 26 and on a counter shaft 32, and a sprocket chain 33 trained around the sprocket wheels 30, 31; sprocket wheels 34, 34ª mounted respectively on the shaft 32, and on the shaft 35 of the proofer and a sprocket chain 36 trained around said sprocket wheels 34, 34ª. On the shaft 35 sprocket wheels 37 are mounted, around which are trained sprocket chains 38 which carry the trays 39 of the proofer between them and convey the trays through the proofer chamber (not shown) as is well understood by those skilled in the art to which this invention pertains. The loading end of the proofing chamber is enclosed between side walls 13ª and end walls one of which is shown at 13ᵇ.

The various sprocket wheels in the train of gearing between the proofer shaft 35 and the shafts of the spacing drum and loading drum are so proportioned as to enable the spacing drum, loading drum and proofer trays to move in timed relation with each other whereby the dough lumps delivered from the rounder will be loaded into the proofer trays, six dough lumps in each tray, or any other desired number.

The loading drum 25 in the form of the invention illustrated has a middle section 25ª and two side sections 25ᵇ, 25ᶜ, disposed at the sides thereof, the middle section having a diameter somewhat larger than the diameter of the side sections whereby the circumferential faces of the side sections are offset toward the center of the loading drum, the purpose of which will be hereinafter set forth.

In the operation of the drum all of the dough lumps are originally picked up by the middle drum section and some are carried on the circumferential face thereof until discharged into the middle portion of the proofer tray; others roll from the middle section through channels in the middle and side sections and are discharged laterally of the drum into chutes in which they roll to the end portions of the trays, and still other dough lumps roll through channels from the middle section to the circumferential faces of the side sections and are carried thereby and discharged therefrom into chutes in which they roll to the intermediate spaces in the trays.

On the circumferential face of the middle drum section are fastened equi-distantly spaced fingers 40, desirably arranged in groups, that are arranged to pass through the spaces between the discs of the spacing drum and pick up the dough lumps from the pockets therein. The timing of the two drums is such that the spacing drum presents a dough lump to the loading drum each time that a group of fingers passes a loaded pocket therein. In Fig. 1 a group of fingers is illustrated as having just passed the pocket identified as 21ª and has picked up a dough ball therefrom and the next succeeding pocket is approaching the position of pocket 21ª to enable the next succeeding group of fingers to pick up the dough lump therefrom. This is more fully set forth in the prior Patent No. 2,064,437 above referred to.

In the loading device illustrated herein, there are twelve groups of fingers which enable the drum to load two trays with six dough lumps in each, during each complete rotation of the loading drum. The number of groups of fingers may be varied, however, to suit the number of dough lumps to be loaded into each tray.

The circumferential face of the middle drum section, between certain of the groups of fingers, is formed with places for dough lumps to lie on; there are four such places, spaced equi-distantly around the circumference of the drum and designed by the characters 3 and 6. At these places shallow depressions 41, 41ˣ, (see Fig. 5) may be formed in the circumferential face of the middle drum section.

Figure 2:
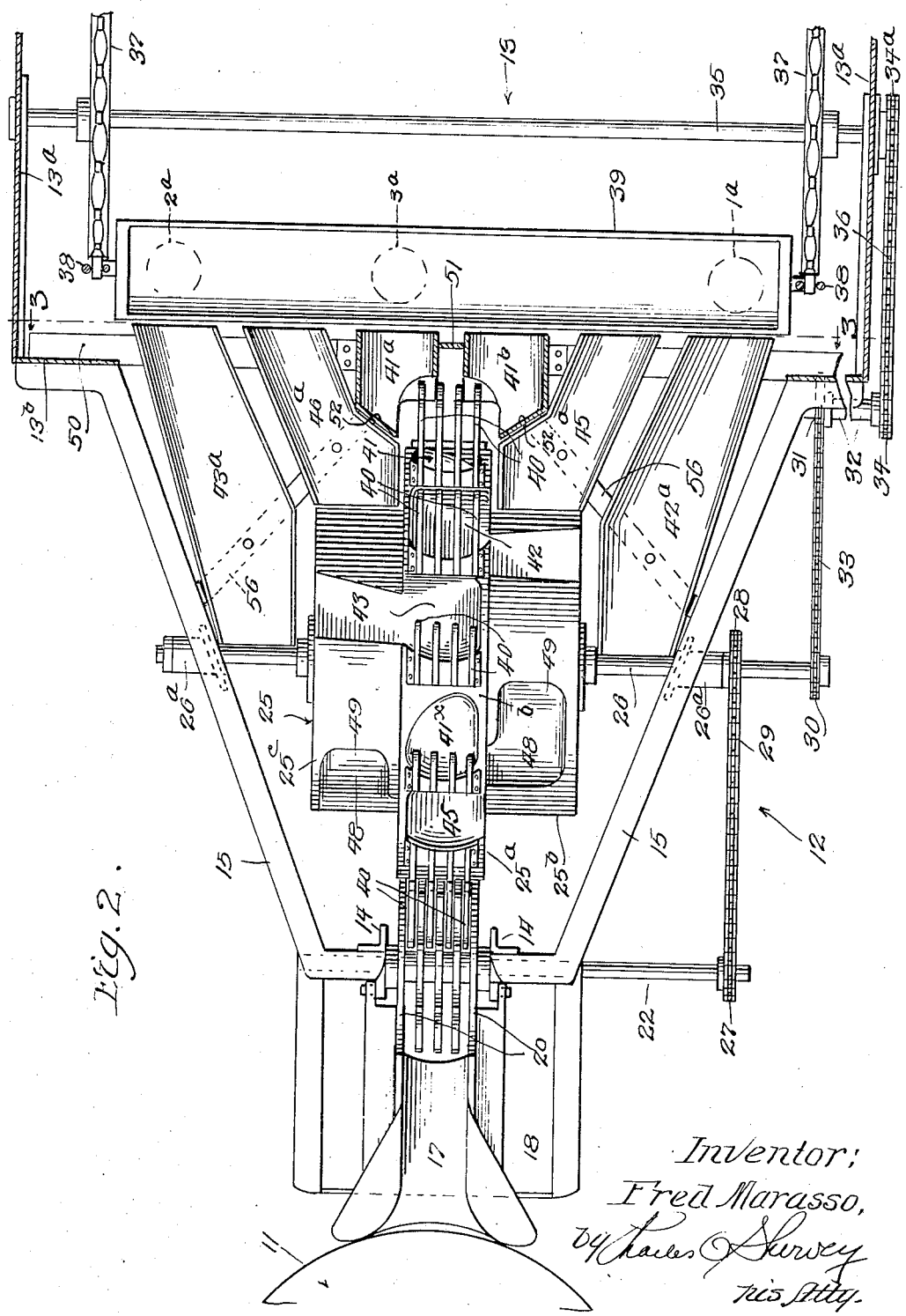
Fig. 2 is a plan of the parts seen in Fig. 1 with the walls of the proofer shown in horizontal section.

The alternate depressions 41 slope or are shaped to direct dough lumps to roll towards the side $a$, of the middle drum section (see Fig. 8) as the drum rotates, and the intermediate depressions 41ˣ slope or are shaped to direct the dough lumps to roll towards the other side $b$, thereof (see Fig. 2). Conveniently, the side margins of the depressions may converge towards one or the other side of the middle drum section (see Figs. 2 and 8) to obtain this result. As the drum carries a dough lump in one of the depressions 41 or 41ˣ and the dough lump approaches a position where it tends to roll out of a depression and down the circumferential face of the middle drum section, the lump is guided towards one side or the other of the drum face by the diagonal or oblique face of the depression so as to leave the drum face at one side or the other of the median line of the drum face and thereby fall into one or the other of two chutes 41ª, 41ᵇ, by which those dough lumps are loaded into the tray as will be hereinafter more fully set forth.

For convenience in describing the construction and operation of the loading drum, the several places between the fingers of the upper half of the drum (see Fig. 1) are designated by the characters 1, 2, 3, 4, 5, and 6 which indicate the sequence in which the dough lumps discharge from the loading drum and are loaded into the trays. In the drawings the drum is shown in a position occupied directly after a dough lump has been picked up from the spacing drum and directly after two dough lumps have been discharged from the places 1, 2, through the lateral faces of the side drum sections and another dough lump has been discharged from the space 3 on the circumferential face of the drum. The positions of these discharged dough lumps in the tray are indicated in Fig. 2 by the dotted lines 1ª, 2ª and 3ª.

From the places 1, 2 (which follow place 3), oppositely inclined channels 42, 43 extend from the circumferential face of the middle drum section through the side sections and open out through the lateral faces thereof. Said channels have sloping bottoms 44 (see Figs. 3, 4) which enable the dough lumps to roll down the channels when the channels reach an approximately upright position, as shown by the channel 43 in Fig. 1. It is to be understood that the channels 42 incline in one direction and lead out through the lateral face of the side section 25<sup>b</sup>, whereas the channels 43 incline in the opposite direction and lead out through the lateral face of the opposite side section 25<sup>c</sup> (see Fig. 2). The dough lumps discharging through the channels 42, 43 fall into chutes 42<sup>a</sup>, 43<sup>a</sup>, which convey them to the outer end portions of the tray.

From the places 4, 5, oppositely inclined channels 45, 46 extend from the circumferential face of the middle drum section to the circumferential faces of the side drum sections, and their inclined bottoms (see Fig. 6) terminate in shallow depressions 48 in the circumferential faces of the side drum sections. The channels 45 slope towards one side section and the channels 46 slope towards the other side section. The bottoms of the shallow depressions 48 are extended in the direction of rotation of the loading drum along lines 49 to the circumferential faces thereof (see Fig. 7) to permit the dough lumps to roll out of the depressions and discharge from the circumferential faces of the side sections in the direction of rotation of the loading drum and fall into chutes 45<sup>a</sup>, 46<sup>a</sup> which convey them to places in the tray between the endmost and middle dough lumps.

It will be understood that during a cycle of operation, or, in other words, during rotation of the loading drum through 180°, six dough lumps are picked up, two of which are delivered to the end portions of the tray, two into spaces adjacent the endmost lumps and two at the middle portion of the tray. This takes place while a tray is traveling upwards, passing the delivery ends of the chutes as will be presently explained.

Supported on a structural member 50 of the proofer is a rectangular box 51 (see Figs. 8, 9 and 10) having an opening at its top and back for the passage of the fingers of the loading drum. The side walls of the box terminate in oblique walls 52 that converge towards each other and leave a space wide enough for the fingers to pass through the box. The box is somewhat wider than the middle drum section but of less width than the entire drum. In the front wall 53 of the box, two openings 54, 55 (see Fig. 3) are formed, and extending through said openings are the downwardly sloping chutes 41<sup>a</sup>, 41<sup>b</sup>, which extend from the oblique walls 52 of the box to a point slightly in front of the front wall of the box, there being space enough between the discharge ends of the chutes and trays to permit the trays to freely pass by them. The chutes 41<sup>a</sup>, 41<sup>b</sup>, are fastened to the box and their adjacent edges are continued upward and toward each other to provide an arch 55<sup>a</sup> (see Fig. 8) and the rear ends of the chutes 41<sup>a</sup>, 41<sup>b</sup>, and arch 55<sup>a</sup>, are cut back from the oblique walls 42 to leave clearance for the fingers 40 to pass them (see Fig. 10). Dough lumps are discharged from the shallow depressions 41, 41<sup>x</sup> at the places 3, 6, on the circumferential face of the middle drum section into one or the other of the chutes 41<sup>a</sup>, 41<sup>b</sup>, depending on the direction the depression is pointed. As shown in Fig. 8, the depression is pointed toward the right; consequently, a dough lump therein will roll towards the right as it begins to descend.

The backs of the fingers which are in advance of the depressions 41 at place 3 are sloped towards the right, whereby the dough lump will be deflected further toward the right and eventually fall into the chute 41<sup>a</sup>. The depressions 41<sup>x</sup> at the place 6 slope towards the left and the backs of the fingers which are in advance thereof slope slightly towards the left so that the dough lumps discharging from the depressions at 6 are discharged into the chute 41<sup>b</sup>. The chutes 41<sup>a</sup>, 41<sup>b</sup>, deliver dough lumps into the middle portion of the tray.

The inclined chutes 42<sup>a</sup>, 43<sup>a</sup>, extend downwardly and laterally, from the lateral faces of the side drum sections, to places in vertical alignment with the discharge ends of the chutes 41<sup>a</sup>, 41<sup>b</sup>, and the other inclined chutes 45<sup>a</sup>, 46<sup>a</sup>, extend downwardly and laterally from the circumferential faces of the side sections to places in vertical alignment with the discharge ends of the other chutes. Straps 56 secured to the frame members 15 and to the box 51 support the upper ends of the chutes and posts 57 secured to the angle iron bar 50 support the lower ends thereof. All of the discharge ends of the chutes are located in one vertical plane with sufficient clearance between them and the trays to permit the latter to pass freely by.

Figure 3:
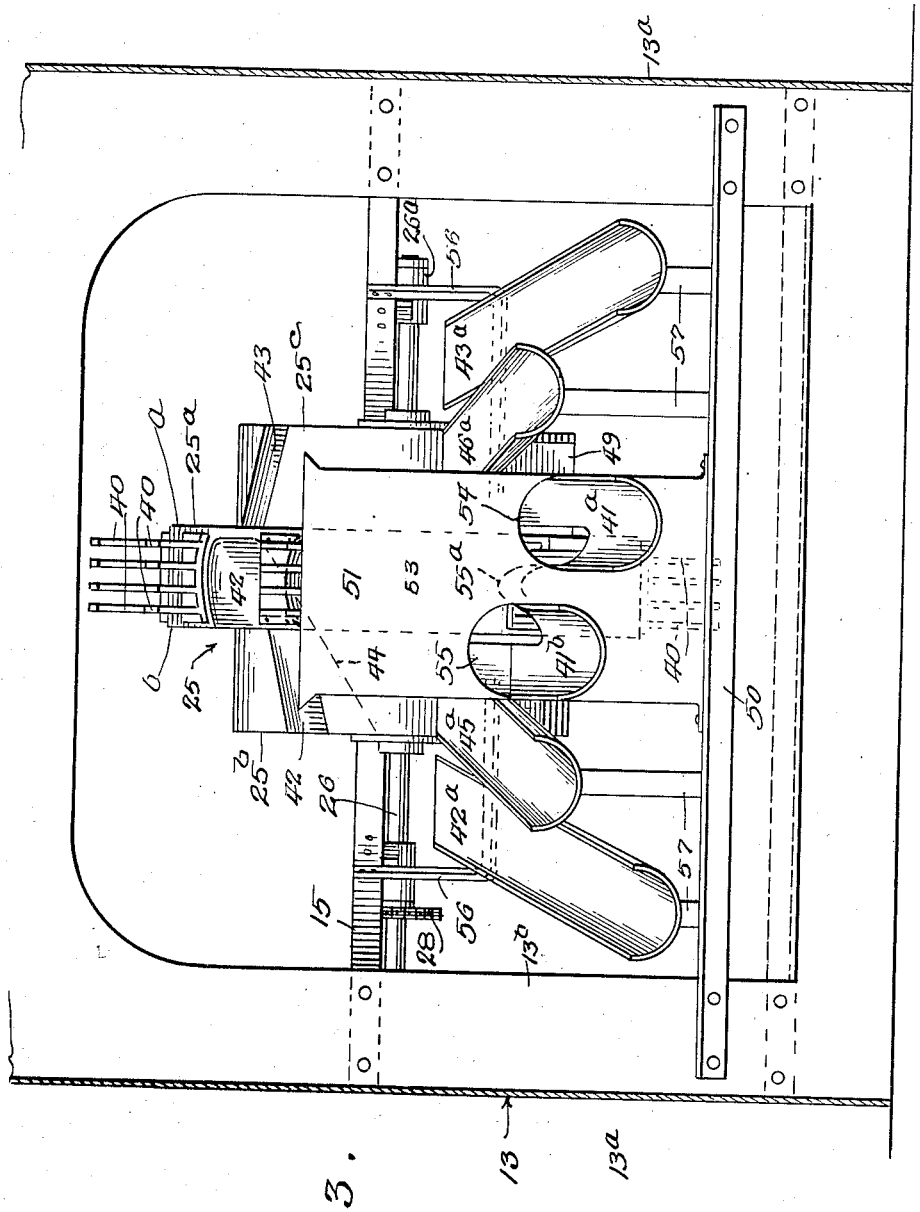
Fig. 3 is an end elevation of the proofing apparatus with the walls of the proofing chamber shown in vertical section, the line of section being indicated at 3—3 in Fig. 2.

The discharge ends of the several chutes are located at different levels, chute 42<sup>a</sup> having the lowest discharge point, chute 43<sup>a</sup> the next highest, and so on, as appears in Fig. 3. The purpose of thus locating the discharge ends of the several chutes is to enable the dough lumps to fall into a tray as it progresses upwards past the discharge ends of the chutes. The arrangement and timing are such that a tray is always below the discharge end of each chute when the dough ball discharges therefrom.

In the operation of the loading apparatus, the rounder delivers the dough lumps, one at a time, to the chute 17, and they roll down the same to the spacing drum which picks them up, one at a time, in its pockets and carries them toward the loading drum.

Describing the operation of the loading drum at the position occupied, as shown in Fig. 1, the fingers in advance of the places marked 1, 2, 3, 4, 5, and 6 on the circumferential face of the middle drum section have each picked up a dough lump from the spacing drum. The dough lump picked up by the fingers behind the place marked 1 has rolled down the channel 42, has discharged through the lateral face of the side drum section 25<sup>b</sup>, has fallen into the chute 42<sup>a</sup>, and has rolled into the tray below the lower end of the chute. The dough lump picked up by the fingers behind the place marked 2 has rolled down the channel 43, has discharged through the lateral face of the side drum section 25<sup>c</sup>, has rolled down the chute 43<sup>a</sup>, and has been discharged into the same tray. The dough ball picked up by the fingers behind the place marked 3 has just discharged therefrom into the chute 41<sup>a</sup>, and has fallen into the same tray. The position of these dough lumps is seen in Fig. 2.

The dough lump picked up by the fingers behind the depression 41<sup>x</sup>, at 6 is resting therein. The dough lump picked up by the fingers behind the channel 45 at 4, has rolled into the depression 48 in the circumferential face of the side drum section 25<sup>b</sup>, and the dough lump picked up by the fingers behind the channel 46 at 5 is still being carried by the fingers. When the channel 46 reaches the point now occupied by channel 45, the dough ball in channel 46 will run down into the depression 48 thereof; when the depression 41× at the place marked 6 reaches the position now occupied by the place 3, the dough ball thereon will roll out of the depression and fall into the chute 41b and discharge into the same tray, and at the same time or directly thereafter the dough ball in the place marked 4, will roll down the straight face 49 and discharge from the circumferential face of the side drum section 25b into the chute 45a and fall into the same tray and directly thereafter the dough ball in the place marked 5 will roll out of the depression and along the straight face and discharge from the circumferential face of the side drum section 25c and will fall into chute 46a and roll into the same tray.

It will be observed that all of the six dough balls, carried by one-half of the drum, discharge into one and the same tray as it is moving upward past the discharge ends of the chutes, and that the dough balls carried by the other half of the loading drum will be discharged in the same manner into the next succeeding tray. This operation is carried on indefinitely.

I claim as new and desire to secure by Letters Patent:

1. Loading apparatus for proofers comprising in combination a rotatory drum, equi-distantly spaced fingers circumferentially disposed about the circumferential face of the drum, there being equi-distantly spaced dough lump carrying places on the circumferential face of the drum located in advance of certain fingers, from which dough lumps are discharged approximately in the same direction as the direction of rotation of the drum; and there being equi-distantly spaced inclined channels located in advance of certain other fingers and extending laterally from the circumferential face of the drum to the side thereof, through which the dough lumps are discharged laterally from the drum; and there being other equi-distantly spaced inclined channels located in advance of certain other fingers and extending laterally from the circumferential face of the drum and terminating in lump carrying places, which which other dough lumps are discharged approximately in the same direction as the direction of rotation of the drum but in planes intermediate the planes in which the first and second mentioned dough lumps are discharged, means to deliver dough lumps to the drum, and dough lump distributing means into which the drum discharges the dough lumps.

2. Loading apparatus for proofers comprising in combination a rotatory drum, equi-distantly spaced fingers circumferentially disposed about the circumferential face of the drum, there being equi-distantly spaced dough lump carrying places on the circumferential face of the drum located in advance of certain fingers from which dough lumps are discharged approximately in the same direction as the direction of rotation of the drum; and there being equi-distantly spaced inclined channels located in advance of certain other fingers and extending laterally from the circumferential face of the drum to the side thereof, through which other dough lumps are discharged laterally from the drum; and there being other equi-distantly spaced inclined channels located in advance of certain other fingers and extending laterally from the circumferential face of the drum and terminating in lump carrying places, from which other dough lumps are discharged approximately in the same direction as the direction of rotation of the drum but in planes intermediate the planes in which the first and second mentioned dough lumps are discharged, means to deliver dough lumps to the drum, and inclined distributing chutes into which the dough lumps are discharged.

3. Loading apparatus for proofers comprising in combination a rotatory drum, equi-distantly spaced fingers circumferentially disposed about the circumferential face of the drum, there being equi-distantly spaced dough lump carrying places on the circumferential face of the drum located in advance of certain fingers, from which dough lumps are discharged approximately in the same direction as the direction of rotation of the drum; and there being equi-distantly spaced inclined channels located in advance of certain other fingers and extending laterally from the circumferential face of the drum to the side thereof, through which the dough lumps are discharged laterally from the drum; and there being other equi-distantly spaced inclined channels located in advance of certain other fingers and extending laterally from the circumferential face of the drum, and terminating in lump carrying places, from which other dough lumps are discharged approximately in the same direction as the direction of rotation of the drum but in planes intermediate the planes in which the first and second mentioned dough lumps are discharged, dough lump spacing means for delivering dough lumps to the drum and inclined distributing chutes into which the dough lumps are discharged by the drum.

4. Loading apparatus for proofers comprising in combination a rotatory drum having a middle section and two side sections of less diameter than the middle section, equi-distantly spaced fingers circumferentially disposed about the circumferential face of the middle section, there being equi-distantly spaced dough lump carrying places on said circumferential face of the middle section located in advance of certain fingers and from which dough lumps are discharged approximately in the same direction as the direction of rotation of the drum; and there being equi-distantly spaced, oppositely inclined channels located in advance of certain of the other fingers, extending from the circumferential face of the middle section to and terminating at the lateral faces of the side sections; and there being equi-distantly spaced, oppositely inclined channels located in advance of certain other fingers, extending from the circumferential face of the middle section to and terminating on the circumferential faces of the side sections, means to deliver dough lumps to the middle section, and dough lump distributing means into which the drum discharges the dough lumps.

5. Loading apparatus for proofers comprising in combination a rotary drum having a middle section and two side sections of less diameter that the middle section, equi-distantly spaced fingers circumferentially disposed about the circumferential face of the middle section, there being equi-distantly spaced dough lump carrying places on said circumferential face of the middle section located in advance of certain fingers from which dough lumps are discharged approximately in the same direction as the direction of rotation of the drum, and there being equidistantly spaced, oppositely inclined channels located in advance of certain of the other fingers, extending from the circumferential face of the middle section to and terminating at the lateral faces of the side sections; and there being equi-distantly spaced, oppositely inclined channels located in advance of certain other fingers, extending from the circumferential face of the middle section to and terminating on the circumferential faces of the side sections, means to deliver dough lumps to the middle section, and inclined dough distributing chutes into which the drum discharges the dough lumps.

6. Loading apparatus for proofers comprising in combination a rotary drum having a middle section and two side sections of less diameter than the middle section, equi-distantly spaced fingers circumferentially disposed about the circumferential face of the middle section, there being equi-distantly spaced dough lump carrying places on said circumferential face of the middle section located in advance of certain fingers from which dough lumps are discharged approximately in the same direction as the direction of rotation of the drum, and there being equi-distantly spaced, oppositely inclined channels located in advance of certain of the other fingers and extending from the circumferential face of the middle section to and terminating at the lateral faces of the side sections; and there being equi-distantly spaced, oppositely inclined channels located in advance of certain other fingers and extending from the circumferential face of the middle section to and terminating on the circumferential faces of the side sections, a rotary dough lump spacing drum for delivering the dough lumps to the loading drum, and inclined distributing chutes into which the dough lumps are discharged by the loading drum.

7. Loading apparatus for proofers comprising in combination a rotary drum having a middle section and two side sections of less diameter than the middle section, equi-distantly spaced fingers circumferentially disposed about the circumferential face of the middle section, there being equi-distantly spaced dough lump carrying places on the circumferential face of the middle section located in advance of certain fingers, from which dough lumps are discharged approximately in the same direction as the direction of rotation of the drum, and there being equi-distantly spaced, oppositely inclined channels located in advance of certain of the other fingers and extending from the circumferential face of the middle section to and terminating at the lateral faces of the side sections, and there being equi-distantly spaced, oppositely inclined channels located in advance of certain other fingers and extending from the circumferential face of the middle section to and terminating in depressions on the circumferential faces of the side sections, the bottoms of said depressions being extended in approximately straight lines to the circumferential faces of the side sections, means to deliver dough lumps to the middle section, and dough lump distributing means into which the drum discharges the dough lumps.

8. Loading apparatus for proofers comprising in combination a rotary drum having a middle section and two side sections of less diameter than the middle section, equi-distantly spaced fingers circumferentially disposed about the circumferential face of the middle section, there being equi-distantly spaced dough lump carrying places on the circumferential face of the middle section located in advance of certain fingers from which dough lumps are discharged approximately in the same direction as the direction of rotation of the drum, and there being equi-distantly spaced, oppositely inclined channels in advance of certain of the other fingers and extending from the circumferential face of the middle section to and terminating at the lateral faces of the side sections; and there being equi-distantly spaced, oppositely inclined channels in advance of certain other fingers extending from the circumferential face of the middle section to and terminating in the form of depressions on the circumferential faces of the side sections, means to deliver dough lumps to the middle section, and dough lump distributing means into which the drum discharges the dough lumps.

9. Loading apparatus for proofers comprising in combination a rotary drum having a middle section and two side sections of less diameter than the middle section, equi-distantly spaced fingers circumferentially disposed about the circumferential face of the middle section, there being equi-distantly spaced dough lump carrying depressions on said circumferential face of the middle section located in advance of certain of said fingers, the alternate depressions being arranged to deflect the dough lumps carried therein towards one side of the median line of the circumferential face, and the intermediate depressions arranged to deflect the dough lumps towards the other side of said median line, and there being equi-distantly spaced, oppositely inclined channels located in advance of certain of the other fingers and extending from the circumferential face of the middle section to and terminating at the lateral faces of the side sections; and there being equi-distantly spaced, oppositely inclined channels located in advance of certain other fingers and extending from the circumferential face of the middle section to and terminating on the circumferential faces of the side sections, means to deliver dough lumps to the middle section, and dough lump distributing means into which the drum discharges the dough lumps.

10. Loading apparatus for proofers comprising in combination a rotatory drum having a middle section and two side sections of less diameter than the middle section, equidistantly spaced fingers circumferentially disposed about the circumferential face of the middle section, there being equi-distantly spaced dough lump carrying depressions on said circumferential face of the middle section located in advance of certain of said fingers, the alternate depressions being arrange to deflect the dough lumps carried therein towards one side of the median line of the circumferential face and the intermediate depressions being arranged to deflect the dough lumps towards the other side of said median line, and there being equi-distantly spaced, oppositely inclined channels located in advance of certain of other fingers and extending from the circumferential face of the middle section to and terminating at the lateral faces of the side sections; and there being equi-distantly spaced, oppositely inclined channels located in advance of certain other fingers and extending from the circumferential face of the middle section to and terminating on the circumferential faces of the side sections, means to deliver dough lumps to the middle section and dough lump distributing chutes into which the drum discharges the dough lumps.

11. Loading apparatus for proofers comprising in combination a rotatory drum, equi-distantly spaced fingers circumferentially disposed about the circumferential face of the drum, there being equi-distantly spaced dough lump carrying places on the circumferential face of the drum located in advance of certain fingers, from which dough lumps are discharged approximately in the same direction as the direction of rotation of the drum; and there being equi-distantly spaced, oppositely inclined channels located in advance of certain other fingers and extending laterally from the circumferential face of the drum to the sides thereof, through which the dough lumps are discharged laterally from the drum; and there being other equi-distantly spaced, oppositely inclined channels located in advance of certain other fingers and extending laterally from the circumferential face of the drum and terminating in lump carrying places, from which other dough lumps are discharged approximately in the same direction as the direction of rotation of the drum but in planes intermediate the planes in which the first and second mentioned dough lumps are discharged, means to deliver dough lumps to the drum, and dough lump distributing means into which the drum discharges the dough lumps.

12. Loading apparatus for proofers comprising in combination a rotatory drum having a middle section and two side sections of less diameter than the middle section, equi-distantly spaced fingers circumferentially disposed about the circumferential face of the middle section, there being equi-disantly spaced dough lump carrying depressions on said circumferential face of the middle section located in advance of certain of said fingers, alternate depressions being arranged to deflect the dough lumps carried therein towards one side of the median line of the circumferential face, and the intermediate depressions arranged to deflect the dough lumps towards the other side of said median line, and there being equi-distantly spaced, oppositely inclined channels located in advance of certain of the other fingers and extending from the circumferential face of the middle section to and terminating at the lateral faces of the side sections; and there being equi-distantly spaced, oppositely inclined channels located in advance of certain other fingers and extending from the circumferential face of the middle section to and terminating on the circumferential faces of the side sections, means to deliver dough lumps to the middle section, dough lump distributing chutes for receiving dough lumps discharged from the middle section, said chutes being connected by an arch for deflecting the dough lumps into the chutes, and other chutes into which dough lumps are discharged from the other discharge places on the drum.

13. Loading apparatus for proofers comprising in combination a rotatory drum, equi-distantly spaced fingers circumferentialy disposed about the circumferential face of the drum, there being equi-distantly spaced dough lump carrying places on the circumferential face of the drum located in advance of certain fingers from which dough lumps are discharged approximately in the same direction as the direction of rotation of the drum; and there being equi-distantly spaced inclined channels located in advance of certain other fingers and extending laterally from the circumferential face of the drum to the side thereof through which other dough lumps are discharged laterally from the drum; and there being other equi-distantly spaced inclined channels located in advance of certain other fingers and extending laterally from the circumferential face of the drum and terminating in lump carrying places, from which other dough lumps are discharged approximately in the same direction as the direction of rotation of the drum but in planes intermediate the planes in which the first and second mentioned dough lumps are discharged, means to deliver dough lumps to the drum, and inclined distributing chutes into which the dough lumps are discharged by the drum, the discharge ends of the chutes into which the dough lumps are successively delivered being located at progressively higher elevations whereby to discharge the dough lumps into an upwardly traveling proofer tray.

14. Loading apparatus for proofers comprising in combination a rotatory drum, equi-distantly spaced fingers circumferentially disposed about the circumferential face of the drum, there being equi-distantly spaced dough lump carrying places on the circumferential face of the drum located in advance of certain fingers from which dough lumps are discharged approximately in the same direction as the direction of rotation of the drum; and there being equi-distantly spaced inclined other channels located in advance of certain other fingers and extending laterally from the circumferential face of the drum to the side thereof through which other dough lumps are discharged laterally from the drum; and there being other equi-distantly spaced inclined channels located in advance of certain other fingers and extending laterally from the circumferential face of the drum and terminating in lump carrying places, from which other dough lumps are discharged approximately in the same direction as the direction of rotation of the drum but in planes intermediate the planes in which the first and second mentioned dough lumps are discharged, means to deliver dough lumps to the drum, and inclined lump distributing chutes, certain of which have receiving ends located in position to receive dough lumps discharged from the middle section, the receiving ends of the other chutes being located to receive dough lumps discharged from the side faces of the side sections and the receiving ends of other chutes being located to receive dough lumps discharged from the circumferential faces of the side sections.

15. A loading drum comprising a middle section and two side sections of less diameter than the middle section, twelve groups of fingers secured on the circumferential face of the middle section at equi-distant places thereon, there being four equi-distant dough lump carrying places on the circumferential face of the middle section located in advance of equi-distant groups of fingers; and there being two pairs of oppositely inclined channels extending laterally from the circumferential face of the middle section to the side faces of the side sections, each pair being diametrically opposed and located at two spaces between two adjacent dough lump carrying places and there being two pairs of oppositely inclined channels extending laterally from the circumferential face of the middle section to the sides thereof and discharging from the circumferential faces of the side sections, said last mentioned pairs of channels being diametrically opposed and located at the other spaces between the other dough lump carrying places, and lump distributing means upon which the drum progressively discharges the dough lumps.

FRED MARASSO.